United States Patent
Kirkeby et al.

(10) Patent No.: US 9,889,619 B2
(45) Date of Patent: Feb. 13, 2018

(54) METHOD FOR MANUFACTURING A ROTOR BLADE FOR A WIND TURBINE

(71) Applicant: Siemens Aktiengesellschaft, Munich (DE)

(72) Inventors: Klaus Kirkeby, Norresundby (DK); Anders Overgaard, Frederikshavn (DK)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 461 days.

(21) Appl. No.: 14/587,297

(22) Filed: Dec. 31, 2014

(65) Prior Publication Data

US 2015/0251370 A1 Sep. 10, 2015

(30) Foreign Application Priority Data

Mar. 10, 2014 (EP) .................................. 14158529

(51) Int. Cl.
| | |
|---|---|
| *B29D 99/00* | (2010.01) |
| *B29C 70/34* | (2006.01) |
| *B29C 70/46* | (2006.01) |
| *B29C 33/00* | (2006.01) |
| *B29C 70/30* | (2006.01) |
| *B29C 33/76* | (2006.01) |
| *B29L 31/08* | (2006.01) |

(52) U.S. Cl.
CPC ...... *B29D 99/0025* (2013.01); *B29C 33/0016* (2013.01); *B29C 70/342* (2013.01); *B29C 70/46* (2013.01); *B29C 33/76* (2013.01); *B29L 2031/085* (2013.01); *Y02E 10/721* (2013.01); *Y02P 70/523* (2015.11); *Y10T 156/1002* (2015.01)

(58) Field of Classification Search
CPC ............................ B29D 99/0025; B29C 70/30
See application file for complete search history.

(56) References Cited

U.S. PATENT DOCUMENTS

| | | | | |
|---|---|---|---|---|
| 3,239,011 A | * | 3/1966 | Brownlee | B64C 27/473 416/226 |
| 5,346,367 A | * | 9/1994 | Doolin | B29D 99/0025 156/213 |

(Continued)

FOREIGN PATENT DOCUMENTS

| | | |
|---|---|---|
| EP | 2123431 A1 | 11/2009 |
| EP | 2261501 A2 | 12/2010 |
| EP | 2441951 A1 | 4/2012 |

*Primary Examiner* — Matthew J Daniels
*Assistant Examiner* — Marta S Dulko
(74) *Attorney, Agent, or Firm* — Beusse Wolter Sanks & Maire

(57) ABSTRACT

A method for manufacturing a rotor blade, including: a) arranging a first layup of fiber material inside a mold, the first layup corresponding to an airfoil of the rotor blade, b) arranging a second layup of fiber material on a core member before and/or after arranging the core member in the mold, the second layup including the core member corresponding to a web of the rotor blade, the core member comprising a recess configured to ensure a smooth transfer of loads into and out of the web, and c) curing a resin impregnating the fiber material of the first and second layup to form the rotor blade.

15 Claims, 4 Drawing Sheets

(56) References Cited

U.S. PATENT DOCUMENTS

| | | | | |
|---|---|---|---|---|
| 5,547,629 A * | 8/1996 | Diesen | B29C 33/505 | 264/257 |
| 6,945,727 B2 * | 9/2005 | Christman | B29C 65/00 | 244/132 |
| 7,258,828 B2 * | 8/2007 | Fish | B29C 65/54 | 156/245 |
| 7,740,453 B2 * | 6/2010 | Zirin | F03D 1/005 | 416/226 |
| 8,043,067 B2 * | 10/2011 | Kuroiwa | F03D 1/0675 | 416/223 R |
| 8,057,189 B2 * | 11/2011 | Riahi | F03D 1/0675 | 416/224 |
| 8,262,362 B2 * | 9/2012 | Yarbrough | F03D 1/0683 | 29/527.1 |
| 8,876,483 B2 * | 11/2014 | Gruhn | B29B 11/16 | 416/230 |
| 9,057,276 B2 * | 6/2015 | Lee | F01D 5/141 | |
| 9,500,179 B2 * | 11/2016 | Arendt | F03D 1/0675 | |
| 9,506,452 B2 * | 11/2016 | Bakhuis | F03D 1/0675 | |
| 2007/0251090 A1 * | 11/2007 | Breugel | B29C 70/30 | 29/889.7 |
| 2009/0068017 A1 * | 3/2009 | Rudling | F03D 1/0675 | 416/219 R |
| 2009/0162206 A1 * | 6/2009 | Zirin | F03D 1/0675 | 416/223 R |
| 2010/0028161 A1 * | 2/2010 | Vronsky | F03D 1/0641 | 416/238 |
| 2010/0135815 A1 * | 6/2010 | Bagepalli | F03D 1/0675 | 416/226 |
| 2010/0162567 A1 * | 7/2010 | Kirkwood | B64C 3/28 | 29/897.2 |
| 2010/0303631 A1 * | 12/2010 | Payne | F03D 1/001 | 416/226 |
| 2010/0310379 A1 * | 12/2010 | Livingston | F03D 1/001 | 416/229 R |
| 2011/0008175 A1 * | 1/2011 | Gau | F03D 1/0675 | 416/233 |
| 2011/0031758 A1 * | 2/2011 | Mitsuoka | B32B 15/06 | 290/55 |
| 2011/0100542 A1 * | 5/2011 | Faulkner | B29C 33/30 | 156/245 |
| 2011/0126978 A1 * | 6/2011 | Gau | B29D 99/0028 | 156/305 |
| 2011/0142663 A1 * | 6/2011 | Gill | F03D 1/0675 | 416/226 |
| 2011/0158788 A1 * | 6/2011 | Bech | F03D 1/0675 | 415/1 |
| 2011/0176928 A1 * | 7/2011 | Jensen | F03D 1/0675 | 416/233 |
| 2011/0229336 A1 * | 9/2011 | Richter | B29C 65/505 | 416/226 |
| 2011/0299995 A1 * | 12/2011 | Kootstra | F03D 1/0658 | 416/232 |
| 2012/0027612 A1 * | 2/2012 | Yarbrough | F03D 1/065 | 416/226 |
| 2012/0027613 A1 * | 2/2012 | Yarbrough | F03D 1/065 | 416/226 |
| 2012/0027614 A1 * | 2/2012 | Yarbrough | F03D 1/065 | 416/226 |
| 2012/0067515 A1 * | 3/2012 | Dahl | B29C 70/467 | 156/245 |
| 2012/0082547 A1 * | 4/2012 | Baker | F03D 1/0675 | 416/1 |
| 2012/0093627 A1 * | 4/2012 | Christenson | F03D 1/001 | 415/1 |
| 2012/0301316 A1 * | 11/2012 | Velez Oria | F03D 1/0675 | 416/233 |
| 2013/0075025 A1 * | 3/2013 | Guitton | B29C 70/68 | 156/245 |
| 2013/0149164 A1 * | 6/2013 | Hansen | B64F 5/0009 | 416/226 |
| 2013/0216388 A1 * | 8/2013 | Akhtar | F03D 1/0675 | 416/226 |
| 2013/0266452 A1 * | 10/2013 | Smith | B64C 11/26 | 416/226 |
| 2013/0272893 A1 * | 10/2013 | Fabre | B29C 70/24 | 416/226 |
| 2013/0315747 A1 * | 11/2013 | Schibsbye | F03D 1/0675 | 416/230 |
| 2014/0010662 A1 * | 1/2014 | Duelm | F01D 5/147 | 416/230 |
| 2014/0271217 A1 * | 9/2014 | Baker | F03D 1/0633 | 416/226 |
| 2014/0301859 A1 * | 10/2014 | Hancock | F03D 1/0675 | 416/230 |
| 2015/0316023 A1 * | 11/2015 | Sandercock | B29D 99/0028 | 416/229 A |

\* cited by examiner

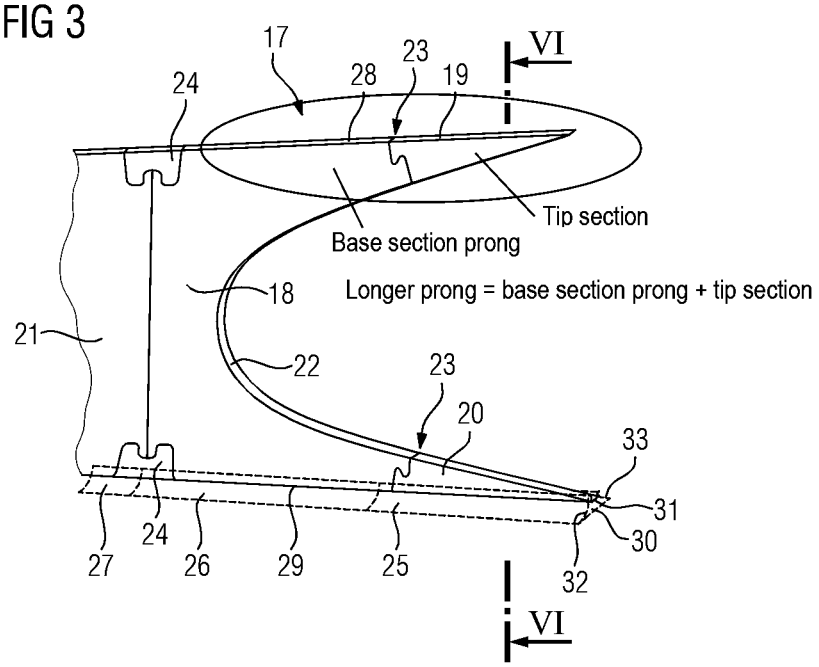
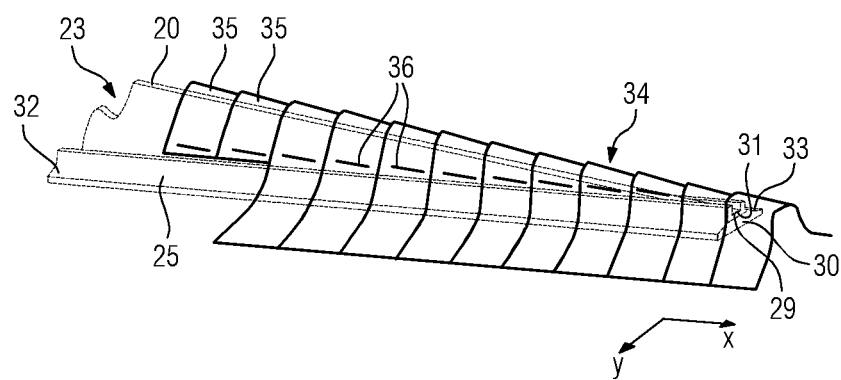

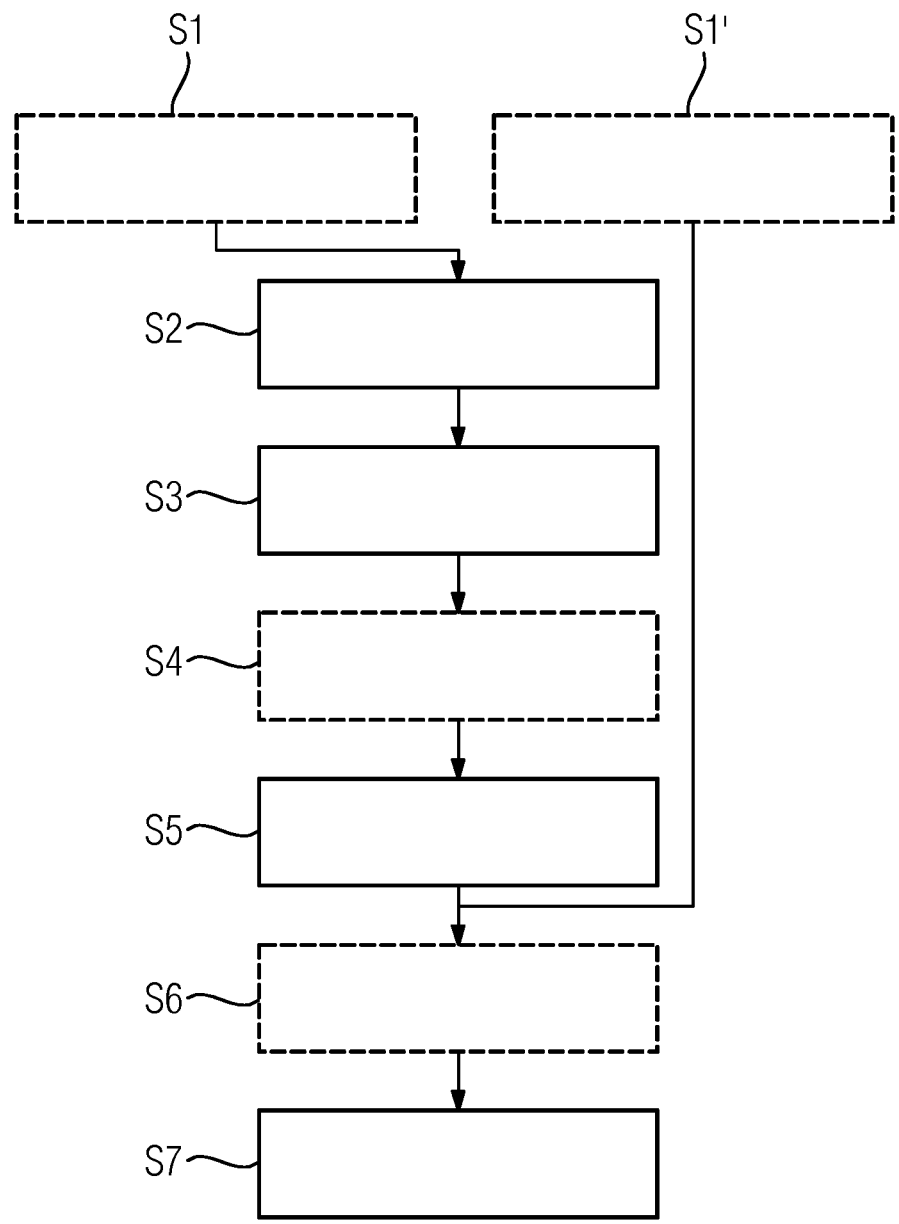

METHOD FOR MANUFACTURING A ROTOR BLADE FOR A WIND TURBINE

CROSS REFERENCE TO RELATED APPLICATIONS

This application claims the benefit of European Application No. EP14158529 filed Mar. 10, 2014, incorporated by reference herein in its entirety.

FIELD OF INVENTION

The present invention relates to a method for manufacturing a rotor blade for a wind turbine.

BACKGROUND OF INVENTION

Modern wind turbine rotor blades are built from fiber-reinforced composites combined with core members, such as balsa wood or plastic foam.

For example, EP 2 123 431 A1 describes a method for manufacturing a rotor blade using a vacuum assisted resin transfer molding (VARTM)-process. In a first step of the manufacturing process, fiber material is laid onto a lower part and an upper part of a mold, respectively. The fiber material is secured in place by vacuum applied from beneath. Then, mold cores are covered in vacuum bags and are placed in the lower part of the mold together with a web (also known as shear web). Next, the upper part of the mold, together with the fiber material, is turned 180 degrees about its longitudinal axis and put into place so that the mold is closed. In a further step, vacuum is applied to the space between the mold cores and the mold. Then, resin is injected. When the resin has set, the mold cores are removed, the mold is opened and the cured blade is removed from the mold.

The webs typically employed in the process are manufactured in a separate process. According to said separate process, plywood plates are covered with a fiber material. The fiber material is injected with a resin. Once the resin has set, the cured web comprising a fiber reinforced resin and a plywood core can be taken out of a corresponding mold.

For some applications, the webs are required to have a recess at one end. The recess is configured to ensure a smooth transfer of loads into and out of the rotor blade, i.e. the recess avoids stress concentrations due to abrupt changes in the geometry. The recess is machined into said end of the web. In this process about 60-100 kg of web material need to be removed which requires substantial manpower and causes waste.

SUMMARY OF INVENTION

One objective of the present invention is to provide an improved method for manufacturing a rotor blade for a wind turbine.

Accordingly, a method for manufacturing a rotor blade for a wind turbine is provided. The method comprises: arranging a first layup of fiber material inside a mold, the first layup corresponding to an airfoil of the rotor blade, b) arranging a second layup of fiber material on a core member before and/or after arranging the core member in the mold, the second layup including the core member corresponding to a web of the rotor blade, the core member comprising a recess configured to ensure a smooth transfer of loads into and out of the web, and c) curing a resin impregnating the fiber material of the first and second layup to form the rotor blade.

The method is advantageous in that there is no need anymore to machine the recess into the cured web, thus saving man power and avoiding waste. Rather, the recess is provided in the core member, and the dry or wetted (i.e. impregnated with resin) and therefore flexible second fiber layup is provided so as to follow the geometry of the recess. For example, the core member may be comprised of wood or plastic foam, e.g. polyvinyl chloride (PVC), polyethylene terephthalate (PET), polybutylene terephthalate (PBT) or polyurethane (PU). Both materials may easily be provided with the recess. For example, the core member may be machined, in particular sawed, to have the required shape. Or, in the case of foam in particular, the core member may be cast in the desired shape having the recess. Further, the core member may comprise of a plurality of core elements which can be connected in manner to form the desired shape.

The fiber material used for the first and second layup may comprise fiber material of different shapes and composition. For example, the fiber material may comprise a layup of fibers, rovings, a fiber mat, a fiber fabric, woven fibers or a fiber felt. The fibers may be arranged unidirectionally, in a biax-configuration or in any other configuration. The fibers may comprise glass fibers, carbon fibers and/or aramid fibers, for example. The fiber material may be supplied in a pre-impregnated state (so called prepreg material) or in an unimpregnated state. In the latter case, the fiber material is impregnated with a resin before step (c). For example, the resin may be injected into the fiber material in a resin transfer molding (RTM) or vacuum-assisted resin transfer molding (VARTM)-process. In a VARTM process for example, the first and second layup comprising the fiber material as well as the core member are covered in a vacuum bag. In a further step, vacuum is applied to the region between the vacuum bag and the mold. Then, resin is injected in said region. After the resin has set or has been cured—typically by the addition of external heat—, the vacuum bag and/or the mold is removed and the final rotor blade is obtained. Of course, when using a prepreg material there is no need to inject the fibers material with resin.

Generally speaking, the mold may be an open or a closed mold. For example, the mold may comprise one or more parts, in particular a lower part and an upper part.

"Uncured" herein refers to the resin not being hardened and/or cross-linked at all or not to a substantial extent. "Cured" or "set" refers to the resin being hardened and/or cross-linked to an extent where a shape of the fiber-reinforced resin will not or not significantly change anymore.

Examples of a resin which may be used for impregnating the fiber material are epoxy, polyester, vinylester or any other suitable thermoplastic or duroplastic material.

By the step of arranging the second layup of fiber material on the core member before "and" after arranging the core member in the mold it is meant that first portions of the second layup are laid on the core member before arranging the core member in the mold and second portions of the second layup are laid on the core member after arranging the core member in the mold. Arranging the second layup on the core member before arranging the core member in the mold may ease the layup process due to improved accessibility.

According to a further embodiment, the core member having the recess may already comprise a cured fiber-reinforced plastic material before step b). In this case, the second layup forms an additional layer of fiber material on the core member.

The fiber material of the first and/or second layup in step a) or b) may be dry or wet.

"Layup" herein is defined as one or more layers of fiber material.

"a)", "b)" and "c)" are not to imply a fixed order of the method steps. Rather, the steps a) to c) may be carried out in a different order where appropriate in the mind of the skilled person.

According to a further embodiment, the recess has a parabolic or semicircular shape.

These shapes result in web tips tapering out towards the root of the blade. This improves the load transfer into and out of the web.

According to a further embodiment, the core member comprises at least two interlocked elements.

Interlocking is advantageously achieved by the at least two elements engaging each other, or by providing a third element engaging both elements simultaneously. Standard raw material, e.g. wooden plates, may be used. In particular, the interlocked elements may each be made of a single ply wood plate. Further, the core member may be assembled on site, i.e. at or in the mold.

According to a further embodiment, the two interlocked elements comprise a tongue-and-groove joint and/or are simultaneously engaged by a locking element.

According to a further embodiment, the core member comprises a base section and two tip sections, the base section and the two tip sections at least partially defining the recess, wherein the two tip sections are interlocked with the base section.

Thus, the recess may be obtained in an easy manner. Further, this allows the two tip sections to be mounted to the base section at different stages of the manufacturing process, for example.

According to a further embodiment, the core member and/or the at least two interlocked elements are made of wood and/or foam.

For example plywood, PET or PU may be used.

According to a further embodiment, the core member and/or the at least two interlocked elements are made of a planar material.

This corresponds well with the planar shape of the web.

According to a further embodiment, step b) comprises fastening layers of fiber material of the second layup to the core member by use of staples.

Movement or dislocation of the layers relative to the core member or core element may thus be prevented. Further, the core member or core elements can be prepacked with fiber material and easily transported to the site of the mold.

According to a further embodiment, step b) comprises covering tip sections of the core member defining the recess at least partially by layers of fiber material extending beyond a respective tip section.

The layers may extend beyond the tip section in a sideways and/or longways direction of the tip section. This reduces the risk of delamination at the respective tips of the web from the inner surface of the airfoil.

According to a further embodiment, one of the at least two interlocked elements is covered with the fiber material outside the mold and the other one of the at least two interlocked elements is covered with the fiber material inside the mold.

This offers a process with high flexibility.

According to a further embodiment, wherein the one of the at least two interlocked elements covered with layers of the second layup outside the mold is a tip section of the core member.

It may be advantageous to mount the top tip section only after having arranged the base section and the lower tip section as well as a core member supporting the same inside the mold.

According to a further embodiment, wherein step b) comprises arranging at least one support element between the core member and the first and/or second layup.

The support element may lend support to the core member and/or to the fiber material.

According to a further embodiment, the at least one support element has a groove receiving a corresponding edge of the core member.

The at least one support element may have a triangular cross-section with the groove formed into its tip portion.

According to a further embodiment, further core members are arranged inside the mold to either side of the core member for supporting the same.

According to a further embodiment, the tip section and/or a corresponding support element are only interlocked with the base section after the further core members are arranged inside the mold.

"Wind turbine" presently refers to an apparatus converting the wind's kinetic energy into rotational energy, which may again be converted to electrical energy by the apparatus.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further objects, features and advantages of the present invention become apparent from the subsequent description and depending claims, taken in conjunction with the accompanying drawings, in which:

FIG. 3 shows a perspective view of a core member used to manufacture a web of the rotor blade of FIG. 2;

FIG. 4 is a perspective view of tip section of the core member of FIG. 3;

FIG. 7 shows a flowchart in accordance with an embodiment of a method for manufacturing a component for a wind turbine.

In the Figures, like reference numerals designate like or functionally equivalent elements, unless otherwise indicated.

DETAILED DESCRIPTION OF INVENTION

Figure 1:
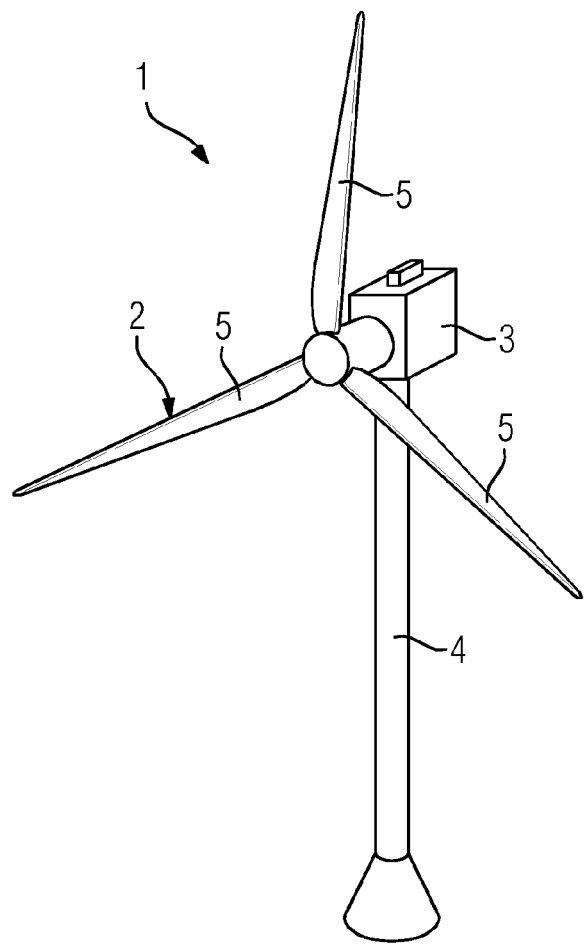
FIG. 1 is a perspective view of a wind turbine according to an one embodiment.

FIG. 1 shows a wind turbine 1 according to an embodiment.

The wind turbine 1 comprises a rotor 2 connected to a generator (not shown) arranged inside a nacelle 3. The nacelle 3 is arranged at the upper end of a tower 4 of the wind turbine 1.

The rotor 2 comprises three blades 5. Rotors 2 of this kind may have diameters ranging from, for example, 30 to 160 meters. The blades 5 are subjected to high wind loads. At the same time, the blades 5 need to be lightweight. For these reasons, blades 5 in modern wind turbines 1 are manufactured from fiber-reinforced composite materials. Therein, glass fibers are generally preferred over carbon fibers for cost reasons. In addition, the blades 5 each comprise one or more core members made of a light material to reduce the weight of the blades 5. The core members also lend support to a fiber layup during manufacturing of the blades 5 as well as during operation of the wind turbine 1.

Figure 2:
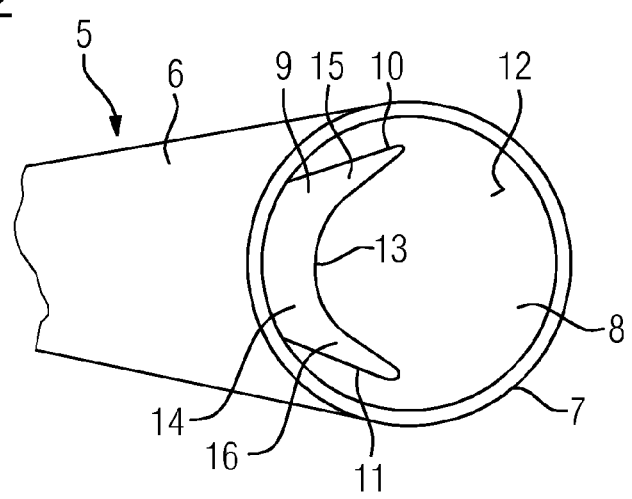
FIG. 2 shows a perspective view of a root end of a rotor blade according to an embodiment.

FIG. 2 shows a perspective view of a root end 6 of one of the blades 5 from FIG. 1.

The blade 5 comprises a shell or airfoil 7 enclosing a space 8. A web 9 inside the space 8 extends in the longitudinal direction of the blade 5. The web 9 is connected along opposite edges 10, 11 to the inside surface 12 of the airfoil 7.

The web 9 has a recess 13 formed in its end facing towards blade root. The recess 13 has a parabolic shape defined by a base section 14 and tip sections 15, 16 tapering down from the base section 14 towards inner surface 12.

While the airfoil 7 is advantageously made from a fiber-reinforced plastic material and, as the case may be, various coatings, the web 9 comprises a fiber-reinforced plastic material and a core member arranged within the fiber-reinforced plastic material.

FIG. 3 illustrates a core member 17 which may be used in a VARTM-process to produce the web 9.

The core member 17 comprises a number of releasably interlocked elements, for example a base section 18, tip sections 19, 20 and a further base section 21. The sections 18, 19, 20 and 21 are made from plywood plates, i.e. plates comprising a number of wooden layers glued together, by cutting or other material removal operations. Having separate elements or sections 18, 19, 20 and 21 allows the raw plates to be of a standard size simplifying storage and manufacturing. Also, having separate elements or sections 18, 19, 20 and 21 may simplify assembly of the core member 17 in- or outside a mold used in the VARTM-process.

The section 18, 19 and 20 are shaped so as to define a parabolic recess 22, the tip sections 19, 20 tapering down from the base section 18. The tip sections 18, 19 may form a tongue-and-groove joint 23 with the base section 18, respectively. In particular, the tongue and groove may respectively have curved shape as indicated in FIG. 3.

The base section 18 may be connected to the further base section 21 by locking elements 24. The locking elements 24 may have a U-shape, each locking element 24 being engaged with both sections 18, 21.

Other ways of connecting the various elements or sections 18, 19, 20 and 21 may be used instead. For example screws or glue may be used.

In another embodiment, the entire core member 17 (or some of its elements or sections) is made of plastic foam, e.g. PET or PU.

Further, FIG. 3 illustrates in dashed lines support elements 25, 26 and 27, which are associated with the sections 20, 18 and 21 respectively and extend along respective upper and lower edges 28, 29 of the core member 17. The support elements associated with the upper edge 28 is not shown in FIG. 3 for reasons of clarity.

Each support element 25, 26 and 27 has a substantially triangular cross-section 30 comprising an upper groove 31, in which a respective edge (corresponding to the edge 29) of the sections 20, 18 and 21 is engaged. Curved sides 32, 33 of the support elements 25, 26 and 27 lend support to a fiber layup as will be explained hereinafter.

FIG. 4 illustrates the tip section 20 and the support element 25 from FIG. 3 as well as a layup 34 of fiber material.

For example, the layup 34 may comprise a plurality of fiber mats 35, the fiber mats 35 overlapping one another at least partially. Each fiber mat 35 may comprise rovings in crisscross arrangement. The fiber mats 35 extend beyond the tip section 20 in a sideways direction Y and a longways direction X in order to reduce the risk of delamination from the inner surface 12 of the airfoil 7, cf. FIG. 2.

The fiber mats 35 are attached to the tip section 20 by staples 36 using a staple gun (not shown). Yet, other ways of fastening the fiber mats 35 to the tip section 20 are also possible. The staples 36 are driven so deeply into the wood of the tips section 20 that they do not damage a vacuum bag employed in the VARTM-process described hereinafter.

Figure 5:
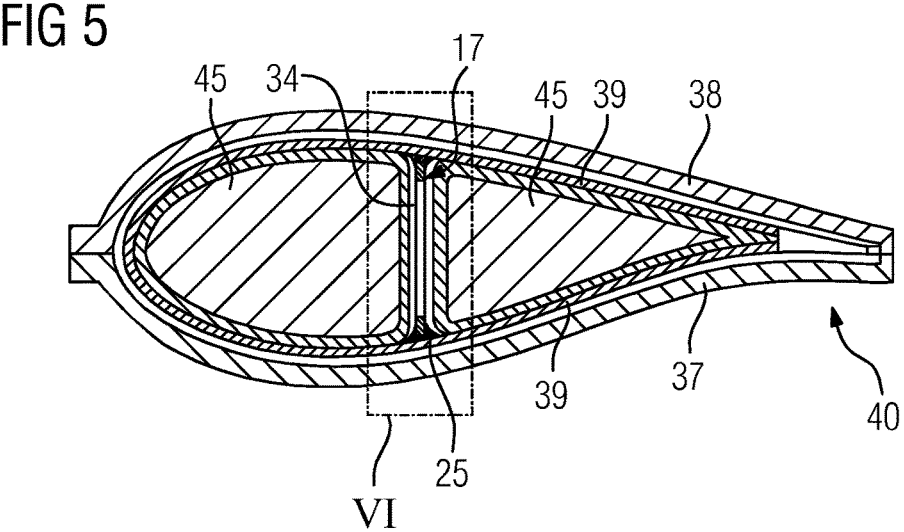
FIG. 5 shows a section view from a VARTM-process according to an embodiment of a method for manufacturing the rotor blade of FIG. 2.

The tip section 20 including the (dry) layup 34 and, as the case may be, the support element 25 may be prepacked and delivered to a mold 40 shown in FIG. 5. In fact, the entire core 17 may, as a whole or each section 18, 19, 20, 21 separately, be prepacked with a (dry) layup 34 and delivered to the mold 40.

Figure 6:
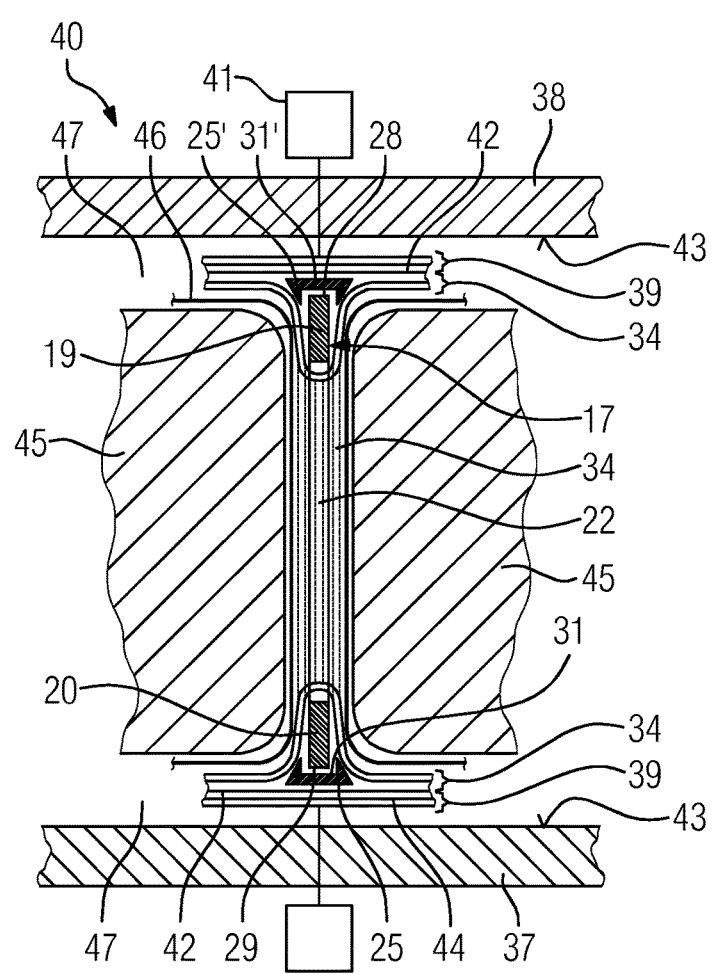
FIG. 6 is an enlarged view VI from FIG. 3, wherein the view VI also corresponds to a section along section line VI-VI in FIG. 3 when the core member is arranged inside the mold.

FIG. 5 shows the mold 40 in a cross-section, and FIG. 6 illustrates an enlarged region VI from FIG. 5. Also, it is referred to FIG. 7 illustrating a flow diagram of the VARTM-process now described.

The mold 40 may be a closed mold comprising a lower and an upper half 37, 38. In the beginning, the upper half 38 is positioned next to the lower half 37 and turned by 180 degrees compared to FIG. 5. A layup 39 of fiber material, comprising for example fiber mats as shown in FIG. 4, is created on the lower and upper half 37, 38 respectively. Then, vacuum is applied underneath a respective layup 39. To this end, a suction pump 41 (FIG. 6) may create a vacuum between an outermost layer 42 of the layup 39 and an inside mold surface 43. The outermost layer 42 may have a lower air permeability then layers 44 underneath layer 42. This step of creating a layup 39 in the mold 40 is illustrated by step S2 in FIG. 7. The layup 39 comprises dry fibers. According to another embodiment, pre-impregnated fibers may be used.

In step S3, the core member 17 is, as a whole or each section 18, 19, 20, 21 separately, arranged inside the lower half 37 of the mold 40 on top of the layup 39. If the sections 18, 19, 20, 21 are brought into the mold 40 separately, they are connected to one another by means of the tongue-and-groove joints 23 and/or the locking elements 24 inside the mold 40, otherwise they are connected outside the mold 40.

The core member 17, as a whole or each section 18, 19, 20, 21 separately, may at the point of arranging them on the layup 39 be covered by the layup 34. Or, the "bare" core member 17 is arranged inside the mold 40 and then the layup 34 is arranged on the core member 17. Portions of the layup 34 covering the base section 18 as well as parts of the recess 22 is shown in dashed lines in FIG. 6. Providing the layup 39 on the core member 17 before arranging the core member 17 inside the mold 40 is indicated by step S1. Step S4 indicates an embodiment where the layup 39 is provided on the core member 17 after arranging the same inside the mold 40.

According to a further embodiment, the sections 18, 20 and 21 are covered with the layup 39 inside the mold 40, and the tip section 22 is prepacked as described in connection with FIG. 4. The step of prepacking is indicated by step S1' in FIG. 7.

Though, before arranging the core member 17 or the sections 18, 20 and 21, the support elements 25, 26 and 27 should be positioned on the layup 39. The edge 29 of the core member 17 is then brought into engagement with the groove 31 in each of the support elements 25, 26 and 27.

Next, core members 45 are wrapped into a vacuum bag 46, respectively. Then, the core members 45 are arranged in the hollow spaces left and right of the core member 17 as shown in FIG. 6. This corresponds to step S5 in FIG. 7.

In the case of having only a prepacked upper tip section 19, this tip section 19 is now connected to the base section 18 by means of the tongue-and-groove joint 23 in step S6. In any case, the support elements 25' (other support elements not shown) are now placed at the top, and the groove 31' is brought into engagement with the edge 28 of the core member 17.

In a further step, the mold 40 is closed by turning the upper half 38 by 180 degrees and placing it on top of the lower half 37. In this manner, the layup 39 comes to lie against the support elements 25' as well as the layup 34.

Then, vacuum is applied to a space 47 between the vacuum bags 46 and the respective mold surfaces 43. In step S7 (FIG. 7), the resin is injected into the space 47 and the mold 40 is heated in order to cure the resin. If prepreg material is used, the step of injecting the resin is not required.

Now, the mold 40 is opened and the mold cores 45 are removed. The cured rotor blade 5 may then be taken out of the lower half 37 of the mold 40. The resin reinforced by the layup 39 corresponds to the airfoil 7, the resin reinforced by the layup 34 and including the core member 17 corresponds to the web 9.

It will be noted that the web 9 produced in this manner has the parabolic recess 13 shown in FIG. 2, and no removal of material is required.

Although the present invention has been described in accordance with preferred embodiments, it is obvious for a person skilled in the art that modifications are possible in all embodiments.

The invention claimed is:

1. A method for manufacturing a rotor blade for a wind turbine, comprising
   a) arranging a first layup of fiber material inside a mold, the first layup corresponding to an airfoil of the rotor blade,
   b) arranging a second layup of fiber material on a core member before and/or after arranging the core member in the mold, wherein the second layup and the core member correspond to a web of the rotor blade, the core member comprising a recess disposed at a root end of the rotor blade and configured to ensure a smooth transfer of loads into and out of the web, and
   c) curing a resin impregnation of the fiber material of the first and the second layup to form the rotor blade,
   wherein the core member comprises at least two interlocked elements, and
   wherein the core member comprises: a base section comprising two prongs; and two tip sections, wherein each tip section is positioned end-to-end with a respective prong, the base section and the two tip sections at least partially defining the recess, wherein the two tip sections are interlocked with the base section.

2. The method of claim 1,
   wherein the recess has a parabolic or semicircular shape.

3. The method of claim 1,
   wherein the at least two interlocked elements comprise a tongue-and-groove joint or are simultaneously engaged by a locking element.

4. The method of claim 1,
   wherein the core member and/or the at least two interlocked elements are made of wood and/or foam.

5. The method of claim 1,
   wherein step b) comprises fastening layers of fiber material of the second layup to the core member by use of staples.

6. The method of claim 1,
   wherein step b) comprises covering tip sections of the core member defining the recess at least partially by layers of fiber material extending beyond a respective tip section.

7. The method of claim 1,
   wherein in step b) one of the at least two interlocked elements is covered with layers of the second layup outside the mold and the other one of the at least two interlocked elements is covered with layers of the second layup inside the mold.

8. The method of claim 7,
   wherein the one of the at least two interlocked elements covered with layers of the second layup outside the mold is a tip section of the core member.

9. The method of claim 1,
   wherein step b) comprises arranging at least one support element between the core member and the first and/or the second layup.

10. The method of claim 9,
    wherein the at least one support element has a groove receiving a corresponding edge of the core member.

11. The method of claim 1,
    wherein further core members are arranged inside the mold to either side of the core member for supporting the same.

12. The method of claim 1,
    wherein further core members are arranged inside the mold to either side of the core member for supporting the same, and
    wherein step b) comprises arranging at least one support element between the core member and the first and/or the second layup,
    wherein a corresponding tip section and/or a corresponding support element are only interlocked with the base section after the further core members have been arranged inside the mold.

13. A method for manufacturing a rotor blade for a wind turbine, comprising:
    arranging a first layup of fiber material inside a mold, wherein the first layup corresponds to an airfoil of the rotor blade,
    assembling a core member comprising: a base section comprising two prongs; and two tip sections, wherein each tip section interlocks end-to-end with a respective prong thereby forming longer prongs, wherein the core member corresponds to a web of the rotor blade, and wherein the longer prongs of the base section define at least part of a recess in the web,
    arranging a second layup of fiber material on the core member before and/or after arranging the core member in the mold, and
    curing a resin impregnation of the first layup and the second layup.

14. The method of claim 13, wherein assembling the core member further comprises abutting a further base section of the core member with an end of the base section that is opposite the two prongs.

15. The method of claim 14, wherein assembling the core member further comprises securing the further base section to the base section with U-shaped locking elements.

* * * * *